United States Patent

Skoczylas et al.

Patent Number: 5,473,837
Date of Patent: Dec. 12, 1995

[54] WATER LEVEL MAINTENANCE DEVICE

[76] Inventors: Henry F. Skoczylas; Georgette P. Skoczylas, both of 524 Jessica La., Bricktown, N.J. 08724

[21] Appl. No.: 313,774

[22] Filed: Sep. 28, 1994

[51] Int. Cl.⁶ .................................................. A47G 7/02
[52] U.S. Cl. .................................................. 47/40.5; 47/79
[58] Field of Search .................... 47/40.5, 79 C; 222/67, 51

[56] References Cited

U.S. PATENT DOCUMENTS

| | | | |
|---|---|---|---|
| 2,120,048 | 6/1938 | Turner | 222/67 |
| 4,825,587 | 5/1989 | Stancil | 47/40.5 |
| 5,224,294 | 7/1993 | Reed | 47/79 C |
| 5,315,787 | 5/1994 | Schleicher | 47/79 C |

Primary Examiner—Henry E. Raduazo

[57] ABSTRACT

A device for maintaining a water level within a fluid reservoir, such as a Christmas tree stand or aquarium. The inventive device includes a pump for supplying water from a container to the fluid reservoir. A switch responsive to the water level of the reservoir communicates with the pump to effect energization thereof as the water level declines. The pump preferably includes a resilient stopper to permit mounting of the pump to an empty bottle or the like.

2 Claims, 4 Drawing Sheets

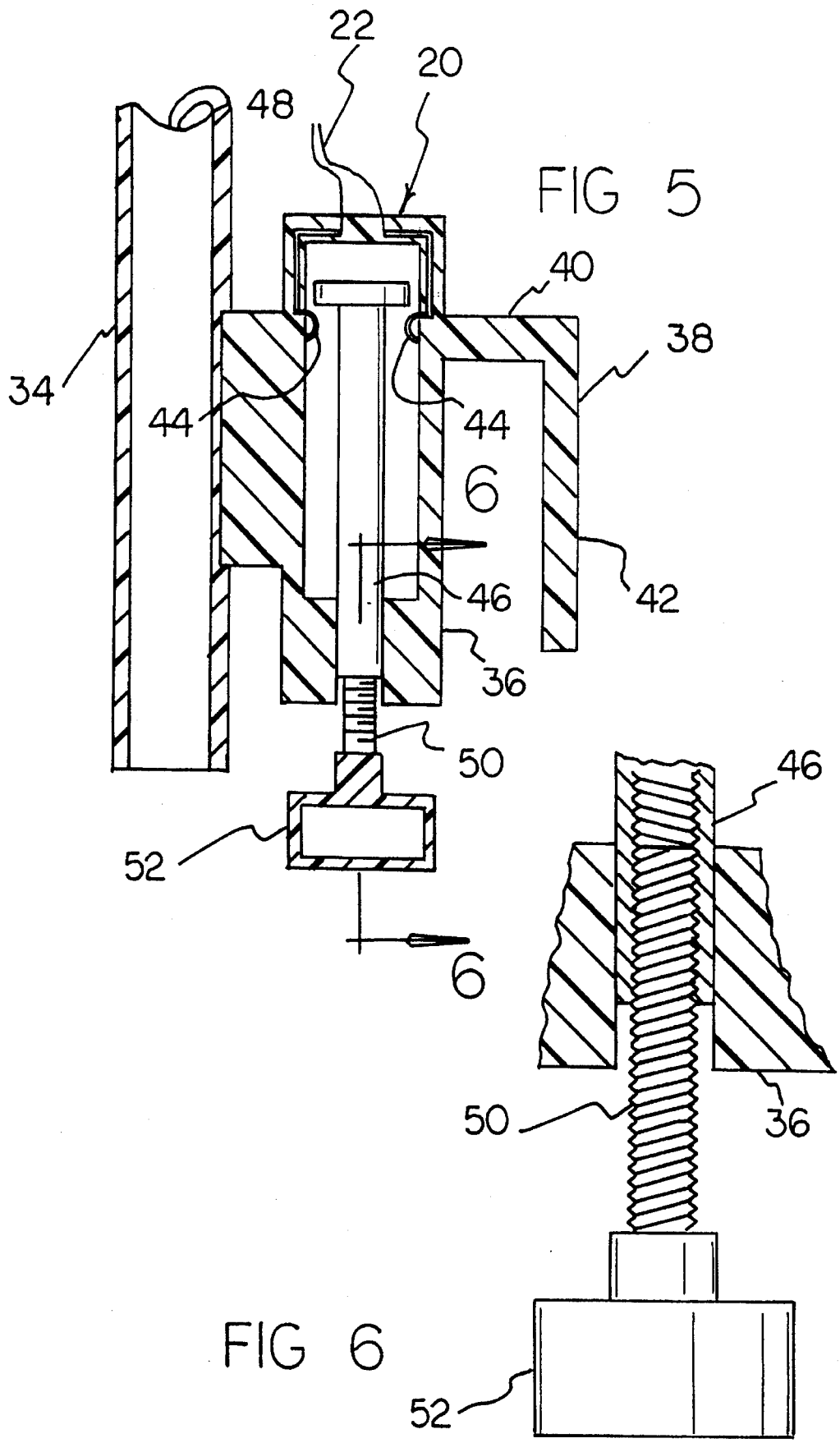

WATER LEVEL MAINTENANCE DEVICE

BACKGROUND OF THE INVENTION

1. Field of the Invention

The present invention relates to irrigation structures and more particularly pertains to a water level maintenance device for maintaining a water level within a fluid reservoir, such as a Christmas tree stand or aquarium.

2. Description of the Prior Art

The use of irrigation structures is known in the prior art. More specifically, irrigation structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art irrigation structures include U.S. Pat. No. 5,243,782; U.S. Pat. No. 5,076,009; U.S. Pat. No. 4,993,176; U.S. Pat. No. 4,930,252; and U.S. Pat. No. D,319,416.

While these devices fulfill their respective, particular objectives and requirements, the aforementioned patents do not disclose a water level maintenance device for maintaining a water level within a fluid reservoir which includes a pump for supplying water from a container to the reservoir, a switch responsive to the water level of the reservoir to effect energization of the pump as the water level declines, and a resilient stopper coupled to the pump to permit mounting thereof to the upper end of an empty bottle or the like.

In these respects, the water level maintenance device according to the present invention substantially departs from the conventional concepts and designs of the prior art, and in so doing provides an apparatus primarily developed for the purpose of maintaining a water level within a fluid reservoir.

SUMMARY OF THE INVENTION

In view of the foregoing disadvantages inherent in the known types of irrigation structures now present in the prior art, the present invention provides a new water level maintenance device construction wherein the same can be utilized for transferring water from a container to a fluid reservoir to maintain the water level within the reservoir at a desired level. As such, the general purpose of the present invention, which will be described subsequently in greater detail, is to provide a new water level maintenance device apparatus and method which has many of the advantages of the irrigation structures mentioned heretofore and many novel features that result in a water level maintenance device which is not anticipated, rendered obvious, suggested, or even implied by any of the prior art irrigation structures, either alone or in any combination thereof.

To attain this, the present invention generally comprises a device for maintaining a water level within a fluid reservoir, such as a Christmas tree stand or aquarium. The inventive device includes a pump for supplying water from a container to the fluid reservoir. A switch responsive to the water level of the reservoir communicates with the pump to effect energization thereof as the water level declines. The pump preferably includes a resilient stopper to permit mounting of the pump to an empty bottle or the like.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new water level maintenance device apparatus and method which has many of the advantages of the irrigation structures mentioned heretofore and many novel features that result in a water level maintenance device which is not anticipated, rendered obvious, suggested, or even implied by any of the prior art irrigation structures, either alone or in any combination thereof.

It is another object of the present invention to provide a new water level maintenance device which may be easily and efficiently manufactured and marketed.

It is a further object of the present invention to provide a new water level maintenance device which is of a durable and reliable construction.

An even further object of the present invention is to provide a new water level maintenance device which is susceptible of a low cost of manufacture with regard to both materials and labor, and which accordingly is then susceptible of low prices of sale to the consuming public, thereby making such water level maintenance devices economically available to the buying public.

Still yet another object of the present invention is to provide a new water level maintenance device which provides in the apparatuses and methods of the prior art some of the advantages thereof, while simultaneously overcoming some of the disadvantages normally associated therewith.

Still another object of the present invention is to provide a new water level maintenance device for maintaining a water level within a fluid reservoir, such as a Christmas tree stand or aquarium.

Yet another object of the present invention is to provide a new water level maintenance device which includes a pump for supplying water from a container to the reservoir, a switch responsive to the water level of the reservoir to effect energization of the pump as the water level declines, and a resilient stopper coupled to the pump to permit mounting thereof to the upper end of an empty bottle or the like.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is cross sectional view taken along line 5—5 of FIG. 4.

FIG. 6 is further cross sectional view taken along line 6—6 of FIG. 5.

DESCRIPTION OF THE PREFERRED EMBODIMENT

Figure 1:
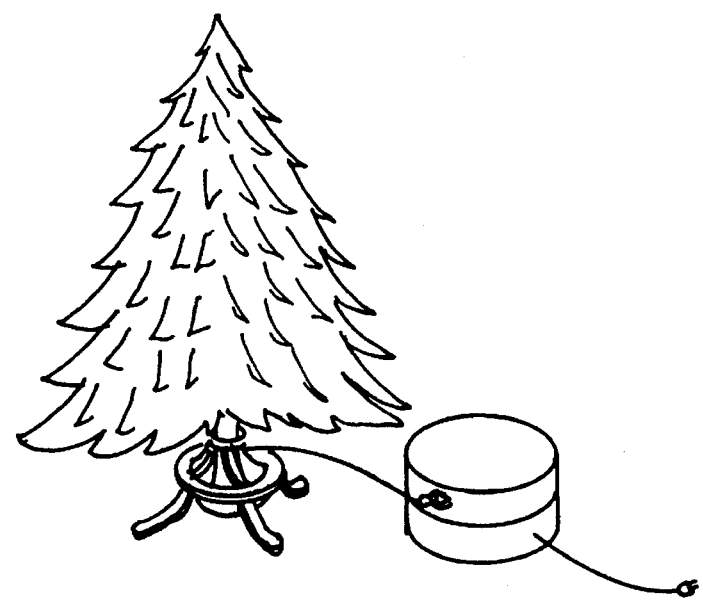
FIG. 1 is an isometric illustration of a prior art irrigation structure.

With reference now to the drawings, and in particular to FIGS. 3-8 thereof, a new water level maintenance device embodying the principles and concepts of the present invention and generally designated by the reference numeral 10 will be described.

Figure 2:
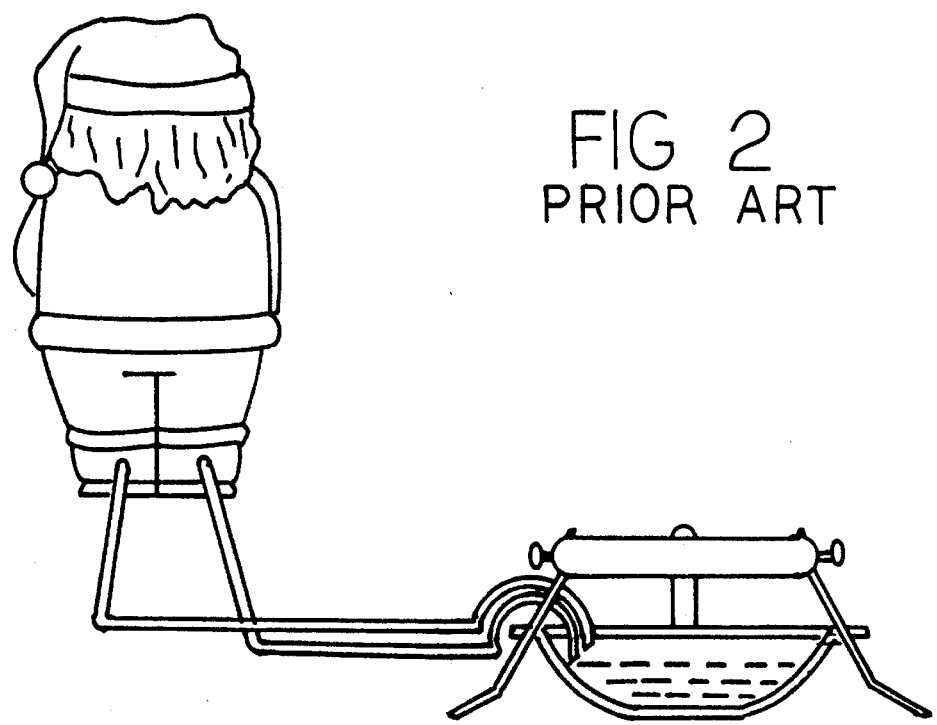
FIG. 2 is a rear elevation view of a further prior art irrigation structure.

Turning initially to FIGS. 1 and 2, wherein prior art irrigation structures are illustrated, it can be shown that the prior art teaches either a larger sump-type reservoir, as in FIG. 1, or a selectively aspirated and gravity feed reservoir, as shown in FIG. 2.

Figure 3:
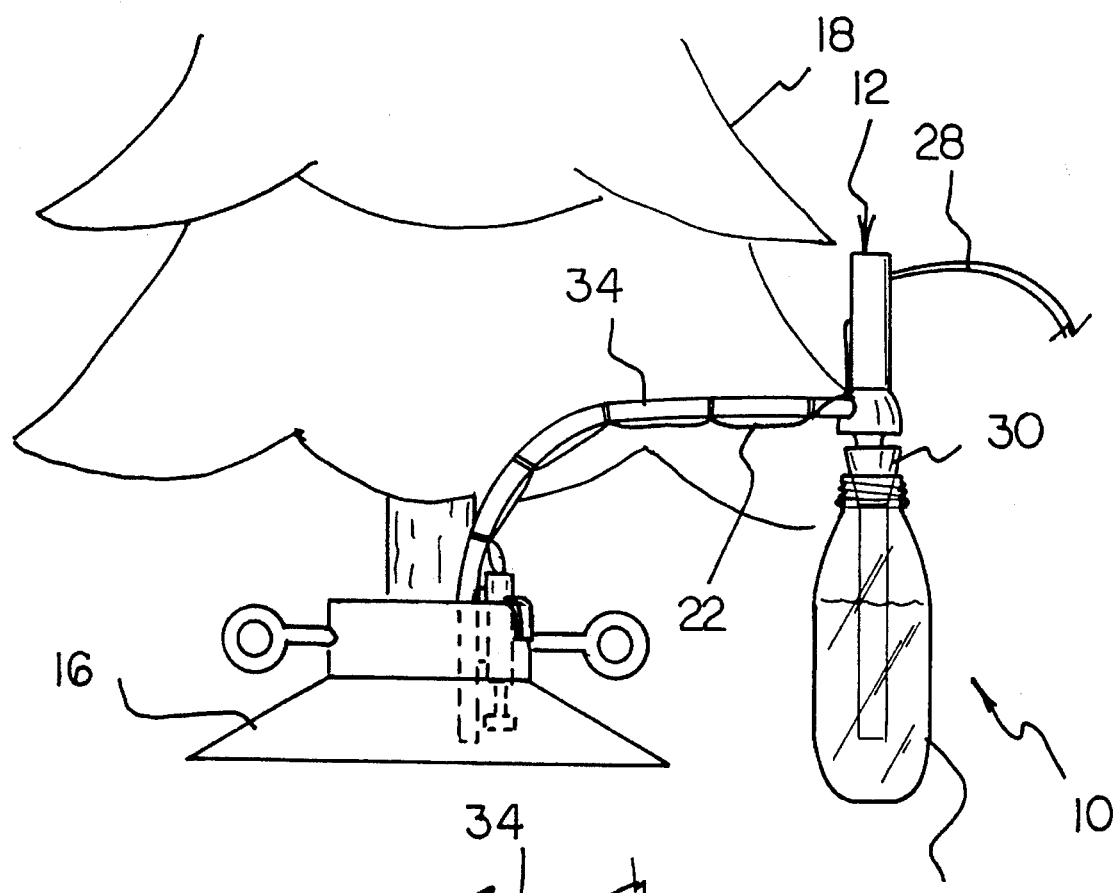
FIG. 3 is a front elevation view of a water level maintenance device according to the present invention.
Figure 4:
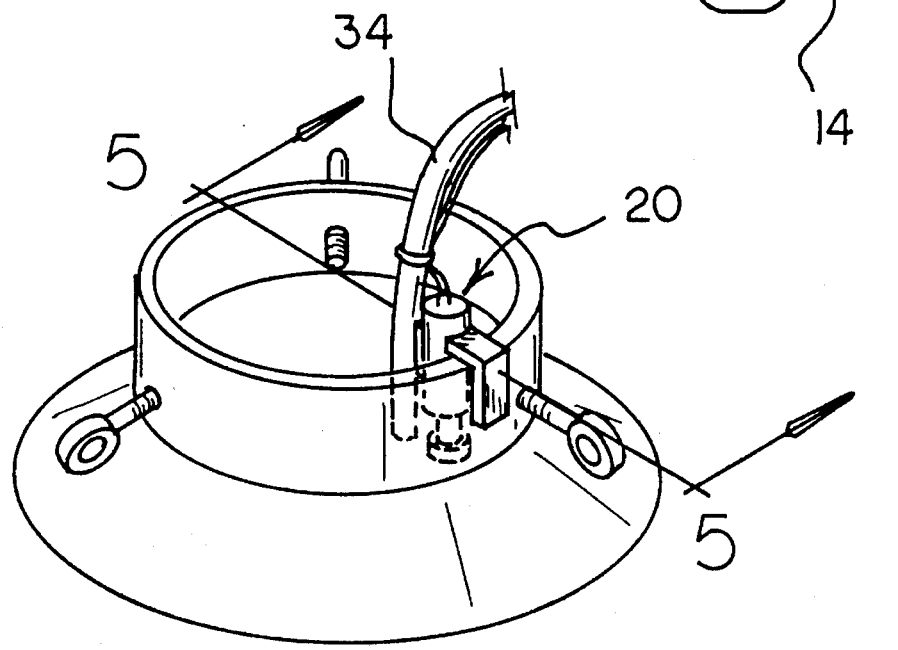
FIG. 4 is an isometric illustration of a portion of the present invention coupled to a support base.

Referring now to FIGS. 3 through 8, wherein the present invention is illustrated, it can be shown that the water level maintenance device 10 substantially departs from the designs of the prior art and comprises a pump means 12 for pumping water or other fluid from a container such as the bottle 14 illustrated in FIG. 3 to a water reservoir such as an aquarium or the support base 16 of a Christmas tree 18. To selectively energize the pump means 12, a switch means 20, as shown in FIG. 4, communicates with the pump means through a plurality of switch wires 22 to effect energization of the pump means in response to a depletion of fluid within the water reservoir or support base 16.

Figure 7:
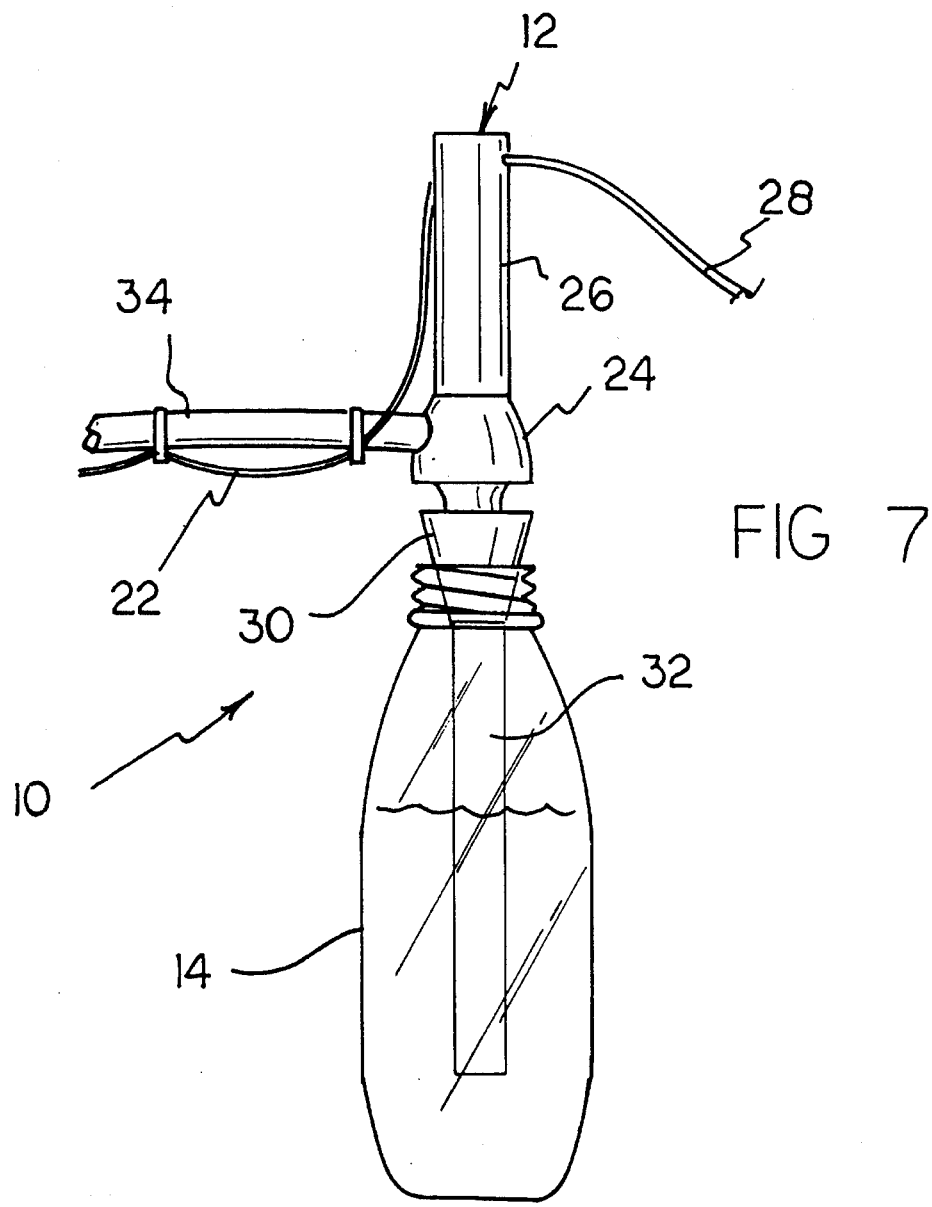
FIG. 7 is an enlarged front elevation view of a further portion of the present invention.
Figure 8:
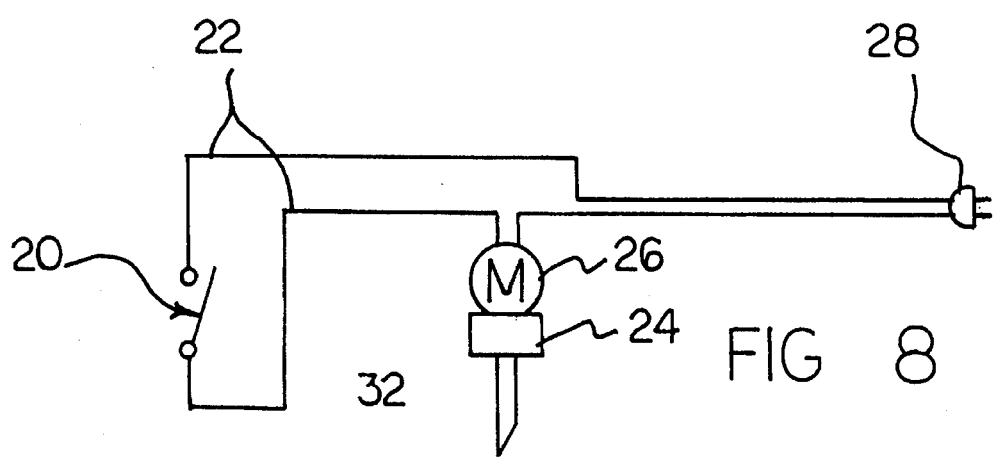
FIG. 8 is a diagrammatic circuitry illustration of the device.

As best illustrated in FIGS. 3 and 7, the pump means 12 preferably comprises a pump 24 mechanically driven by an electric motor 26 having a power cord 28 extending therefrom for communication with a standard electrical outlet. Alternatively, the electric motor 26 may include an integral battery compartment within which batteries or the like can be positioned for supplying electrical power to the electric motor 26 in lieu of the power cord 28. A tapered resilient stopper 30 is coupled to the pump 24 and can be frictionally engaged to the neck of the bottle 14 to mount the pump 24 and the associated electric motor 26 of the pump means 12 to the bottle 14, as shown in FIG. 7. A suction tube 32 extends through the resilient stopper 30 and into fluid communication with water or other fluids present within the bottle 14. The pump 24 can be of any desired configuration, such as a reciprocal pump, a positive displacement pump, or centrifugal pump. Should the pump 24 be of a centrifugal type, a suitable back-flow preventer should be positioned within the suction tube 32, as is well known in the art. As fluid is drawn from the bottle 14 through the suction tube 32 by the pump 24, the fluid is expelled through a supply tube 34 which communicates between the pump and the support base 16 or fluid reservoir. By this structure, an energization of the pump means 12 will effect transfer of the fluid from the bottle 14 to the water reservoir or support base 16. Should it be desirable to extract or pump the fluid from the support base 16 into the bottle 14, the pump means 12 can be reversed to accomplish this end.

As shown in FIGS. 4 through 6, the switch means 20 is operable to effect energization of the pump means 12 in response to a depletion through evaporation or absorption of the fluid contained within the fluid reservoir or support based 16. To this end, the switch means comprises a switch body 36 having an hanging clip 38 extending therefrom for supporting the switch means 20 relative to fluid reservoir or support base 16. The hanging clip 38 includes a first clip member 40 extending orthogonally from the switch body 36 and terminating in an outer distal end, with a second clip member 42 projecting orthogonally from the outer distal end of the first clip member 40 and parallel to the switch body 36. The supply tube 34 is coupled to the switch body 36 in a diametrically opposed relationship relative to the hanging clip 38 and is secured thereto by clamps, adhesives, or the like substantially as shown in FIG. 5. By this structure, the switch means 20 and the distal end of the supply tube 34 can be positioned within the fluid reservoir or support base 16, as illustrated in FIG. 3.

To effect selective energization of the pump means 12 relative to the fluid level within the fluid reservoir or support base 16, the switch wires 22 extend into the switch body 36 and terminate in a pair of spaced contacts 44 arranged along diametrically opposed sides of an interior of the switch body 36. A plunger 46 is movably mounted within the switch body 36 and includes a conductive bridge 48 formed or coupled to an upper end thereof. A lower end of the plunger 46 projects into an aperture formed in a lower end of the switch body 36 and threadably receives a threaded rod 50 projecting exteriorly of the switch body. The threaded rod terminates or is connected at a lower end thereof to a float 52. By this structure, the float 52 will buoyantly reside on top of the fluid or water within the fluid reservoir or support base wherein a depletion of the fluid therefrom will cause the conductive bridge 48 to be gravitationally biased into electrical communication with the contacts 44 to energize the pump means 12. As shown in FIG. 6, the threaded engagement of the threaded rod 50 to the lower end of the plunger 46 permits an infinite adjustment of the desired water level to be attained.

In use, the water level maintenance device 10 can be easily coupled to an empty container, such as the bottle 14 illustrated in FIG. 3, through an engagement of the resilient stopper 30 to the upper neck of the bottle. The resilient stopper 30, because of it's tapered shape, permits the engagement of the pump means 12 to a wide variety of disparate bottles. The supply tube 34 can then be positioned into the fluid reservoir and supported thereby though an engagement of the hanging clip 38 to a side of the reservoir. The switch means 20 will thusly be positioned proximal to the fluid contained within the fluid reservoir or support base 16 and can be adjusted as described above to effect energization of the pump means 12 upon depletion of the water level within the water reservoir to a particular level.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A water level maintenance device comprising:

a pump means for transferring fluid from a container to a water reservoir, said pump means comprising a pump formed in a small generally cylindrical configuration, an electric motor for mechanically driving said pump, a tapered cylindrical shaped resilient stopper coupled to said pump for frictionally engaging a neck of a bottle to mount said pump and said electric motor of said pump means to said bottle, a suction tube in fluid communication with said pump and extending through said resilient stopper and into fluid communication with an interior of said bottle, and a supply tube in fluid communication with said pump; and a switch means for selectively energizing said pump means in response to a depletion of fluid within said water reservoir, said switch means comprising a switch body having a hanging clip extending therefrom for supporting said switch means relative to said fluid reservoir; switch wires extending from said electric motor and into said switch body; a pair of spaced contacts positioned along diametrically opposed sides of an interior of said switch body, said contacts each being in communication with an individual one of said switch wires; a plunger movably mounted within said switch body and including a conductive bridge coupled to an upper end thereof, said plunger having a lower end projecting into an aperture formed in a lower end of said switch body; a threaded rod threadably engaged to said lower end of said plunger and projecting exteriorly of said switch body; and a float connected to a lower end of said threaded rod, wherein said float will buoyantly reside on top of fluid within said fluid reservoir such that a depletion of the fluid therefrom will cause said conductive bridge to be gravitationally biased into electrical communication with said contacts to energize said pump.

2. A water level maintenance device comprising:

a pump means for transferring fluid from a container to a water reservoir, said pump means comprising a pump; an electric motor for mechanically driving said pump; a tapered resilient stopper coupled to said pump for frictionally engaging a neck of a bottle to mount said pump and said electric motor of said pump means to said bottle; a suction tube in fluid communication with said pump and extending through said resilient stopper and into fluid communication with an interior of said bottle; and a supply tube in fluid communication with said pump;

a switch means for selectively energizing said pump means in response to a depletion of fluid within said water reservoir, said switch means comprising a switch body having a hanging clip extending therefrom for supporting said switch means relative to said fluid reservoir, said hanging clip including a first clip member extending orthogonally from said switch body and terminating in an outer distal end, with a second clip member projecting orthogonally from said outer distal end of said first clip member and parallel to said switch body; switch wires extending from said electric motor and into said switch body; a pair of spaced contacts positioned along diametrically opposed sides of an interior of said switch body, said contacts each being in communication with an individual one of said switch wires; a plunger movably mounted within said switch body and including a conductive bridge coupled to an upper end thereof, said plunger having a lower end projecting into an aperture formed in a lower end of said switch body; a threaded rod threadably engaged to said lower end of said plunger and projecting exteriorly of said switch body; and a float connected to a lower end of said threaded rod, wherein said float will buoyantly reside on top of fluid within said fluid reservoir such that a depletion of the fluid therefrom will cause said conductive bridge to be gravitationally biased into electrical communication with said contacts to energize said pump.

* * * * *